(12) United States Patent
Valio et al.

(10) Patent No.: US 7,633,440 B2
(45) Date of Patent: Dec. 15, 2009

(54) POSITIONING RECEIVER

(75) Inventors: Harri Valio, Kämmenniemi (FI); Samuli Pietilä, Tampere (FI)

(73) Assignee: Nokia Corporation, Espoo (FI)

( * ) Notice: Subject to any disclaimer, the term of this patent is extended or adjusted under 35 U.S.C. 154(b) by 128 days.

(21) Appl. No.: 11/578,886

(22) PCT Filed: Apr. 22, 2005

(86) PCT No.: PCT/FI2005/050131
§ 371 (c)(1),
(2), (4) Date: Aug. 2, 2007

(87) PCT Pub. No.: WO2005/103752
PCT Pub. Date: Nov. 3, 2005

(65) Prior Publication Data
US 2007/0279280 A1    Dec. 6, 2007

(30) Foreign Application Priority Data
Apr. 22, 2004   (FI) .................................. 20045145

(51) Int. Cl.
*G01S 5/14*   (2006.01)
(52) U.S. Cl. ............................. 342/357.15; 342/357.12; 342/464
(58) Field of Classification Search ............ 342/357.12, 342/357.15, 464
See application file for complete search history.

(56) References Cited

U.S. PATENT DOCUMENTS

| | | | |
|---|---|---|---|
| 6,141,570 A | 10/2000 | O'Neill, Jr. et al. | |
| 6,298,083 B1 | 10/2001 | Westcott et al. | |
| 7,327,717 B2 * | 2/2008 | Borowski et al. | 370/350 |
| 2003/0009283 A1 | 1/2003 | Pratt | |
| 2003/0156059 A1 * | 8/2003 | McBurney et al. | 342/357.12 |

FOREIGN PATENT DOCUMENTS

| | | |
|---|---|---|
| JP | 05-002062 | 1/1993 |
| WO | 99/45654 A | 9/1999 |
| WO | 99/63360 A | 12/1999 |

OTHER PUBLICATIONS

Patent Abstracts of Japan, Publication No. 05-002062, "Position-Measurement Device", published Jan. 8, 2003.
European Search Report (Application No. 05735259) dated Sep. 19, 2008, 3 pages.

* cited by examiner

*Primary Examiner*—Thomas H Tarcza
*Assistant Examiner*—Fred H Mull

(57) ABSTRACT

A positioning receiver is shown having one or more receiving channels for receiving a signal from a positioning station, a controlling element for controlling the reception of the signal from the positioning station, and a clock generator for generating a clock signal for said controlling element. The positioning receiver also has a sampler for taking samples at least first and second sampling rates, and a selector for selecting samples from the samples taken at the at least first and second sampling rates, to be used in the controlling element, for controlling signal reception. Furthermore, the invention relates to a system, a wireless communication device, a module, a method, and a computer software product.

29 Claims, 5 Drawing Sheets

POSITIONING RECEIVER

CROSS-REFERENCE TO RELATED APPLICATIONS

This application is the U.S. National Stage of International Application Number PCT/FI2005/050131 filed Apr. 22, 2005 which was published Nov. 3, 2005 in English under International Publication Number WO 2005/103752 A1 and which claims priority under 35 USC § 119 to Finnish Patent Application No. 20045145 filed Apr. 22, 2004.

FIELD OF THE INVENTION

The present invention relates to a positioning receiver which comprises one or more receiving channels for receiving a signal from a positioning station, control means for controlling the reception of the signal from a positioning station, and means for generating a clock signal for said control means. The invention also relates to a system which comprises positioning stations which transmit a signal intended for use in positioning, as well as a positioning receiver comprising one or more receiving channels for receiving a signal from the positioning station, control means for controlling the reception of the signal from the positioning station, and means for generating a clock signal for said control means. Furthermore, the invention relates to a wireless communication device comprising a positioning receiver which comprises one or more receiving channels for receiving a signal from a positioning station, control means for controlling the reception of the signal from a positioning station, and means for generating a clock signal for said control means. The invention also relates to a module which comprises one or more receiving channels for receiving a signal from a positioning station, control means for controlling the reception of the signal from a positioning station, and means for generating a clock signal for said control means. Furthermore, the invention relates to a method for performing positioning, comprising the step of receiving a signal from a positioning station on one or more receiving channels, a control step for controlling the reception of the signal from the positioning station, and the step of generating a clock signal to be used in said control step. Furthermore, the invention relates to a computer software product comprising machine executable commands for controlling the positioning, wherein the positioning comprises the step of receiving a signal from a positioning station on one or more receiving channels, a control step for controlling the reception of the signal from the positioning station, and the step of generating a clock signal to be used in said control step.

BACKGROUND OF THE INVENTION

In positioning systems based on satellite positioning, a positioning receiver attempts to receive signals from at least four satellites in order to determine the position of the positioning receiver as well as the time data. Some examples of such satellite positioning systems to be mentioned include the GPS system (Global Positioning System), the GLONASS (GLObal NAvigation Satellite System) as well as the European Galileo system under development. For example the GPS system comprises a plurality of satellites orbiting the globe according to predetermined orbits. These satellites transmit orbit data, on the basis of which the position of the satellite can be determined at each moment of time, provided that the exact time data used in the satellite positioning system is known in the positioning receiver. In the GPS system, the satellites transmit a spread spectrum signal modulated with a code which is individual for each satellite. Thus, the positioning receiver can distinguish between signals transmitted by different satellites by using a reference code corresponding to a satellite code generated locally in the positioning receiver or stored in the positioning receiver.

Each operating satellite of the GPS system transmits a so-called L1 signal at the carrier frequency of 1575.42 MHz. This frequency is also indicated with $154f_0$, where $f_0=10.23$ MHz. Furthermore, the satellites transmit a L2 signal at a carrier frequency of 1227.6 MHz, i.e. $120f_0$. In the satellite, these signals are modulated with at least one pseudo random sequence. This pseudo random sequence is different for each satellite. As a result of the modulation, a code-modulated wideband signal is generated. This modulation technique allows the receiver to distinguish between the signals transmitted by different satellites, although the carrier frequencies used in the transmission are substantially the same. This modulation technique is called code division multiple access (CDMA). In each satellite, for modulating the L1 signal, the pseudo random sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to generate different C/A codes by using identical code generators. The C/A codes are thus binary codes, chipping rate in the GPS system being 1.023 Mchips/s. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

In order to detect the satellite signals and to identify the satellites, the receiver must perform acquisition, whereby the receiver searches for the signal of each satellite at the time and attempts to be synchronized and locked to this signal so that the information transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. In portable devices, the aim is also to reduce the power consumption to a minimum. Thus, for example, a positioning receiver arranged in connection with a wireless communication device is not necessarily kept continuously in operation but primarily when there is a need to perform positioning.

The above-mentioned acquisition and frequency control process must be performed for each satellite signal received in the receiver. Some receivers may comprise several receiving channels, wherein an attempt is made on each receiving channel to acquire the signal of one satellite at a time and to find out the information transmitted by this satellite.

After the acquisition, the positioning receiver attempts to keep synchronized with, i.e., to track the satellite signal. For the acquisition, correlators are normally used for generating signals which are used, for example, to find the correct code phase. The satellite signal received in the receiver is sampled, and the samples are led to the correlators. In receivers of prior art, the sampling rate is typically determined according to the chips in the satellite signal so that the sampling rate is normally twice the chipping rate. This means that two samples are taken of each chip. Applied into the GPS system, this means that about 2 million samples are taken per second. In practice, such a sampling rate is normally sufficient for signal acquisition, but this sampling rate is not necessarily sufficient for tracking, particularly under conditions of multipath propagation, i.e. the satellite signals arrive at the receiver along various routes.

By the selection of the sampling rate, it is possible to affect, for example, the manufacturing costs and the power consumption of the receiver. Normally, a higher sampling rate also involves higher manufacturing costs as well as a higher power consumption, which is due, for example, to the fact that the number of correlators used for the acquisition should also be increased when the sampling rate is increased. A larger number of correlators also requires more circuit board area, which, in turn, increases the power consumption.

In positioning receivers of prior art, the sampling frequency is used for both the acquisition and the tracking. Thus, the sampling frequency is a compromise determined by various properties. Furthermore, in receivers which are intended for receiving signals from the satellites or other positioning stations of more than one positioning systems, there may be a need to use a different sampling rate in the different systems. Thus, when applying the arrangements of prior art, separate receiving channels and sampling means must be provided for the different systems, which makes the implementation of the receiver more complex.

SUMMARY OF THE INVENTION

According to the present invention, an arrangement in a positioning receiver has been invented for improving the operation of the positioning receiver. The invention is based on the idea that at least two different sampling rates are formed, wherein different sampling rates can be used for acquisition and tracking.

According to a first aspect of the present invention there is provided a positioning receiver comprising
one or more receiving channels to receive a signal from a positioning station,
a controlling element for controlling the reception of the signal from the positioning station,
a clock generator for generating a clock signal for said controlling element,
a sampler for taking samples at least first and second sampling rates, and
a first selector for selecting samples from the samples taken at said at least first and second sampling rates, to be used in said controlling element in the control of the signal reception.

According to a second aspect of the present invention there is provided a system comprising:
positioning stations which transmit a signal intended to be used for positioning, and
a positioning receiver which comprises
one or more receiving channels to receive a signal from a positioning station,
a controlling element for controlling the reception of the signal from the positioning station,
a clock generator for generating a clock signal for said controlli for generating a clock signal for said controlling element,
a sampler for taking samples at least first and second sampling rates, and
a first selector for selecting samples from the samples taken at said at least first and second sampling rates, to be used in said controlling element in the control of the signal reception.

According to a third aspect of the present invention there is provided a wireless communication device comprising:
one or more receiving channels to receive a signal from a positioning station,
a controlling element for controlling the reception of the signal from the positioning station,
a clock generator for generating a clock signal for said controlling element,
a sampler for taking samples at least first and second sampling rates, and
a first selector for selecting samples from the samples taken at said at least first and second sampling rates, to be used in said controlling element in the control of the signal reception.

According to a fourth aspect of the present invention there is provided a module comprising:
one or more receiving channels for receiving a signal from a positioning station,
a controlling element for controlling the reception of the signal from the positioning station,
an input for inputting a clock signal for said controlling element,
a sampler for taking samples at at least first and second sampling rates, and
a first selector for selecting samples from the samples taken at said at least first and second sampling rates, to be used in said controlling element in the controlling the reception of the signal.

According to a fifth aspect of the present invention there is provided a method comprising:
receiving a signal from a positioning station on one or more positioning channels,
controlling the reception of the signal from the positioning station,
generating a clock signal to be used in said controlling,
taking samples at at least first and second sampling rates,
selecting samples from the samples taken at said at least first and second sampling rates, and
using the samples in said control step for controlling the signal reception.

According to a sixth aspect of the present invention there is provided a computer software product comprising machine executable commands for
receiving a signal from a positioning station on one or more positioning channels,
controlling the reception of the signal from the positioning station,
generating a clock signal to be used in said controlling,
taking samples at at least first and second sampling rates,
selecting samples from the samples taken at said at least first and second sampling rates, and
using the selected samples in said controlling the reception of the signal.

According to a seventh aspect of the present invention there is provided a positioning receiver, which comprises
one or more receiving channels to receive a signal from a positioning station,
control means for controlling the reception of the signal from the positioning station,
means for generating a clock signal for said control means, means for taking samples at at least first and second sampling rates, and means for selecting samples from the samples taken at said at least first and second sampling rates, to be used in said control means in the control of the signal reception.

The present invention shows, for example, the following advantages over arrangements of prior art. By the arrangement of the invention, it is possible to improve e.g. the tracking function of the positioning receiver without affecting the acquisition and the number of correlators required therein, because the sampling rate can be set to be different for the tracking function and for the acquisition. Furthermore, the power consumption does not necessarily increase significantly, because the number of correlators and thereby the required circuit area is not increased. In the arrangement according to one example of the invention, the positioning receiver can be set in different modes according to the need at the time. Furthermore, the invention makes it possible that the reception of signals from positioning stations of several different positioning systems can be implemented in the same positioning receiver by selecting the sampling frequency in each receiving channel to comply with the requirements of the positioning station to be received at the time.

DESCRIPTION OF THE DRAWINGS

In the following, the invention will be described in more detail with reference to the appended drawings, in which.

DETAILED DESCRIPTION OF THE INVENTION

Figure 1:
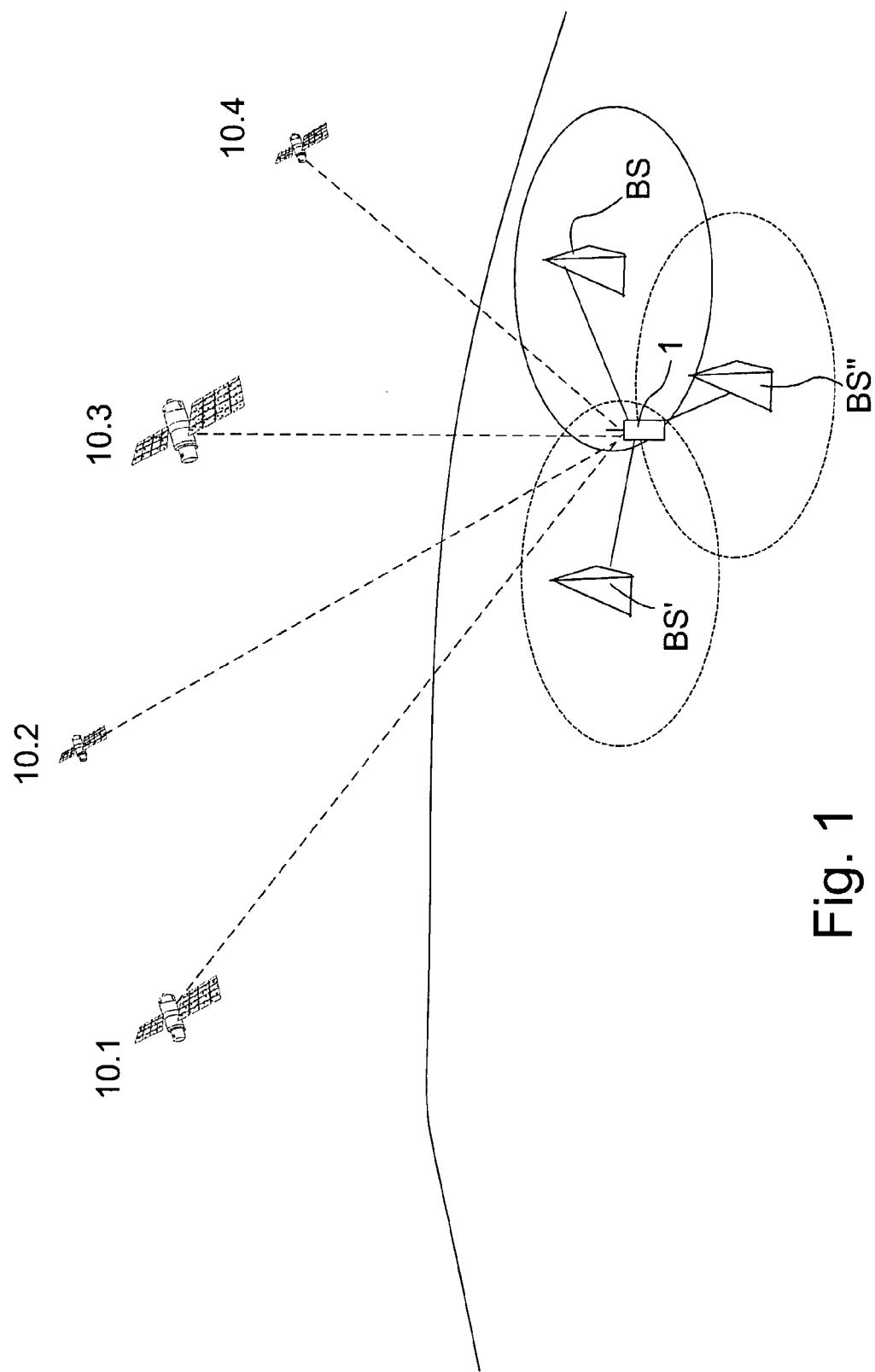
FIG. 1 shows a system according to one embodiment of the invention in a simplified diagram.

In the following, the invention will be described by using the GPS system as an example of a positioning system, but it will be evident that the invention is not limited to be used in the GPS system only. The positioning stations 10.1-10.4 used in the GPS system such as shown in FIG. 1 are satellites which transmit a spread spectrum modulated signal. However, the positioning stations can also be other than satellite stations, for example base stations BS, BS', BS" of a mobile communication system.

FIG. 1 illustrates a system in which signals transmitted by positioning stations 10.1-10.4 are received by a receiver 1. By means of these signals, the receiver performs positioning by using, for example, the timing data of the signals, the code phase data and the orbit parameters, and by computing the location-time solution in a way known as such.

Figure 2:
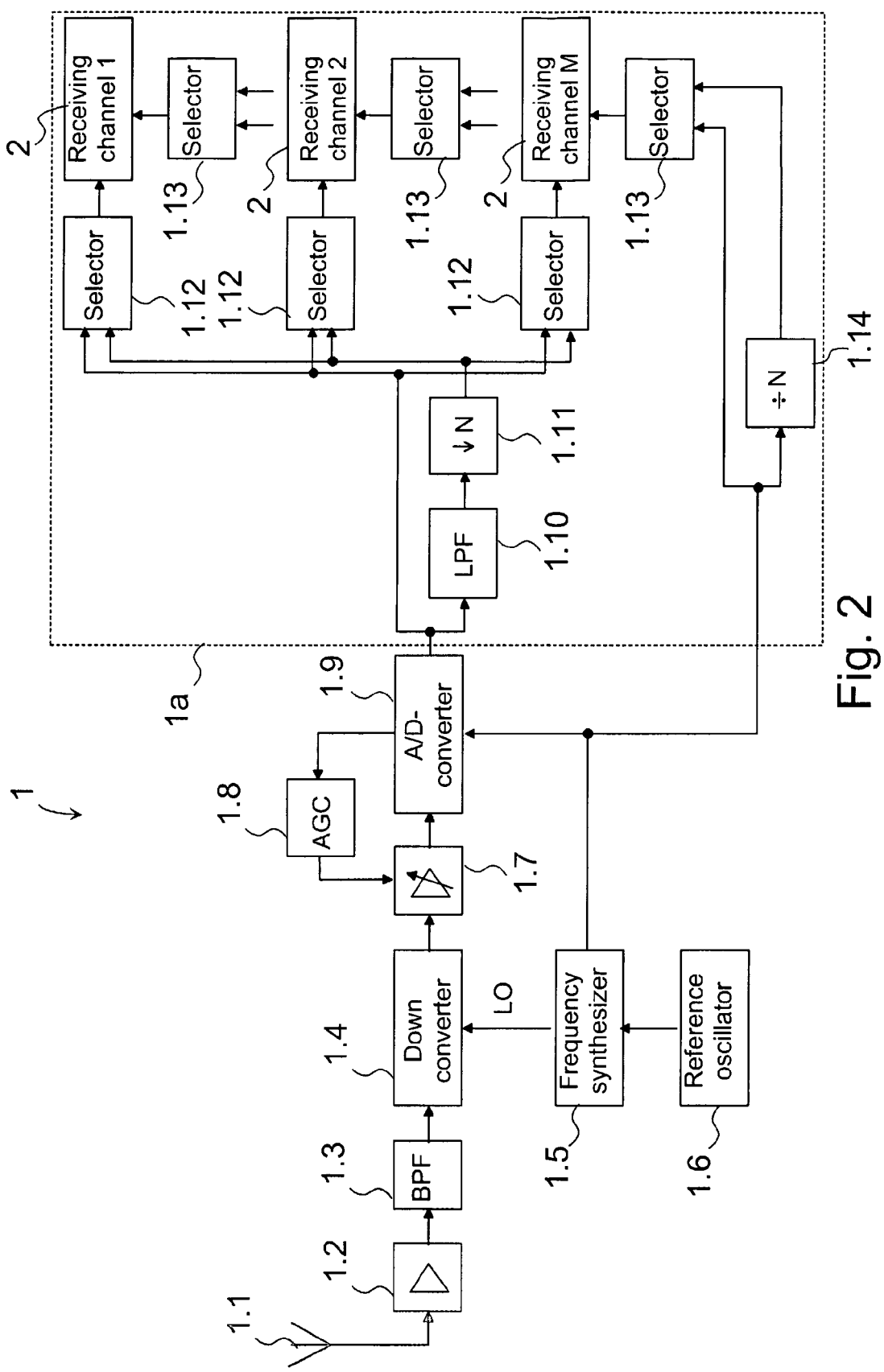
FIG. 2 shows a receiver according to one embodiment of the invention in a simplified block diagram.

In the embodiment of FIG. 2, the receiver 1 comprises several receiving channels 2, wherein the acquisition of a signal from one positioning station is first attempted on each channel. The signal is received with an antenna 1.1 and is input via a high-frequency amplifier 1.2 in a bandpass filter 1.3, where the desired frequency band is separated from the signal to be conveyed to a down-converter 1.4. In the down-converter 1.4, the received signal is mixed with a local oscillator signal LO formed by a frequency synthesizer 1.5, to convert the signal frequency, for example, to a low intermediate frequency or a baseband. The frequency synthesizer 1.5 forms the desired frequency from a reference frequency generated by a reference oscillator 1.6. The signal formed by the down-converter 1.4 is amplified by a controllable amplifier 1.7 whose amplification is controlled by means of an amplification control block 1.8. The amplified signal is converted from the analog format to a digital format, i.e. it is sampled in an analog-to-digital converter 1.9. The samples formed by the analog-to-digital converter 1.9. are led to receiving channels 2. Furthermore, on the basis of the samples, the amplification control block 1.8 produces an amplification control to adjust, if necessary, the amplification of the controllable amplifier 1.7.

The receiver 1 of FIG. 2 comprises a low-pass filter 1.10 and a decimation block 1.11 which are used for low-pass filtering and decimation of the samples; in other words, the low-pass filtered samples are subjected to a new sampling at a lower sampling frequency. The new samples and the original samples are input in selectors 1.12 which are used to select either the first samples, i.e. in this embodiment the samples formed in the analog-to-digital converter 1.9., or the second samples, i.e. the new samples formed at a lower sampling frequency in the decimation block 1.11, to be conveyed to the receiving channels 2. It should be realized that the first samples are not necessarily directly the samples formed by the analog-to-digital converter 1.9, but they may first have been subjected to sampling in another decimation block at a sampling frequency different from the sampling frequency of the decimation block 1.11. In this example, the factor N used in the decimation block 1.11 determines the sampling frequency of the decimation block 1.11 in relation to the sampling frequency of the analog-to-digital converter 1.9, wherein the lower sampling frequency is one Nth part (1/N) of the sampling frequency used by the analog-to-digital converter 1.9.

Furthermore, FIG. 2 shows by broken lines the blocks belonging to a module 1a according to one embodiment of the invention, but it should be evident that when the invention is implemented as the module 1a integrated in a receiver or another device, the module 1a may also comprise other blocks of the receiver 1 than the blocks shown in FIG. 2.

The invention can also be applied in connection with such receivers 1 in which either acquisition or tracking operations only are carried out to control the reception of signals from the satellites. In this case, the control means comprise either acquisition means 2.4-2.8 or tracking means 2.1-2.3, respectively.

In the receiver according to the invention, it is possible to form even more than the first and second samples to be selected for processing in the receiving channels 2.

Figure 3:
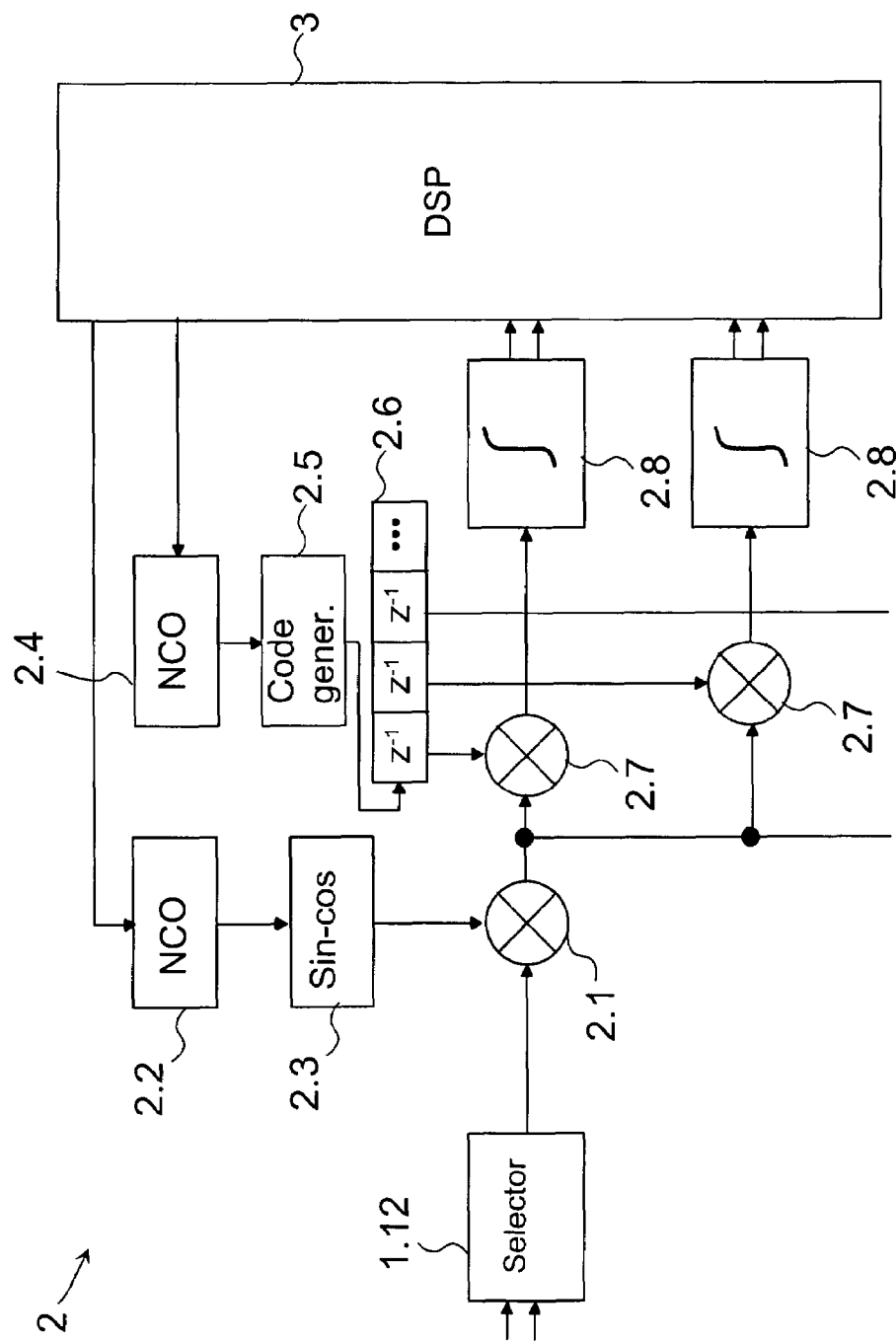
FIG. 3 shows a detail of the receiving channel in the receiver according to one embodiment of the invention.

FIG. 3 shows the structure of receiving channels 2 used in a receiver 1 according to one embodiment of the invention, in a simplified block diagram. Each receiving channel 2 is typically identical, wherein in this context, it will suffice to discuss the operation of one receiving channel 2. The samples selected in the selector 1.12 are led to a first mixing stage 2.1, in which the signal is cleared of a possible intermediate frequency (IF) as well as the satellite Doppler frequency by means of a first numerically controlled oscillator 2.2 (NCO) and a phase shift block 2.3. In the phase shift block 2.3, two signals with a phase difference of 90° are formed of the signal of the numerically controlled oscillator 2.2. In a second numerically controlled oscillator 2.4, a clock signal is generated for a reference code generator 2.5. The reference code generator 2.5 is used for generating a reference code corresponding to the code to be used in the production of the signal from the positioning station 10.1-10.4, which is input in a delay line 2.6. In the delay line 2.6, the number of delays corresponds to the number of integrators 2.8, wherein the output of each delay is input in one of the code multipliers 2.7. The product formed by the code multipliers 2.7 is input in integrators 2.8. The signals formed in the integrators 2.8 are further input in a control block 3, preferably in a digital signal processor DSP, to find out the code phase and the frequency shift of the received signal separately for each channel. The control block 3 forms a back coupling to the receiving channels 2 to adjust the first 2.2 and second numerically controlled oscillators 2.4, if necessary. After the code phase and the frequency shift have been determined, that is, the receiver has tracked the signal to be received, it is possible to start the tracking step, which comprises, for example, the taking of pseudo range measurements and, if necessary, the demodulation and storage of the navigation information transmitted in the signal, if possible.

In the receiver according to the invention, the clock signal to be led to each receiving channel 2 is selected in clock signal selectors 1.13. In the example receiver of FIG. 2, either the first clock frequency or the second clock frequency is selected. The second clock frequency is obtained by dividing the first clock frequency with a factor N in a divider block 1.14. Consequently, this divider N has the same value as the divider used in the decimation block 1.11. However, it should be evident that there can be more than two selectable clock frequencies.

Figure 5:
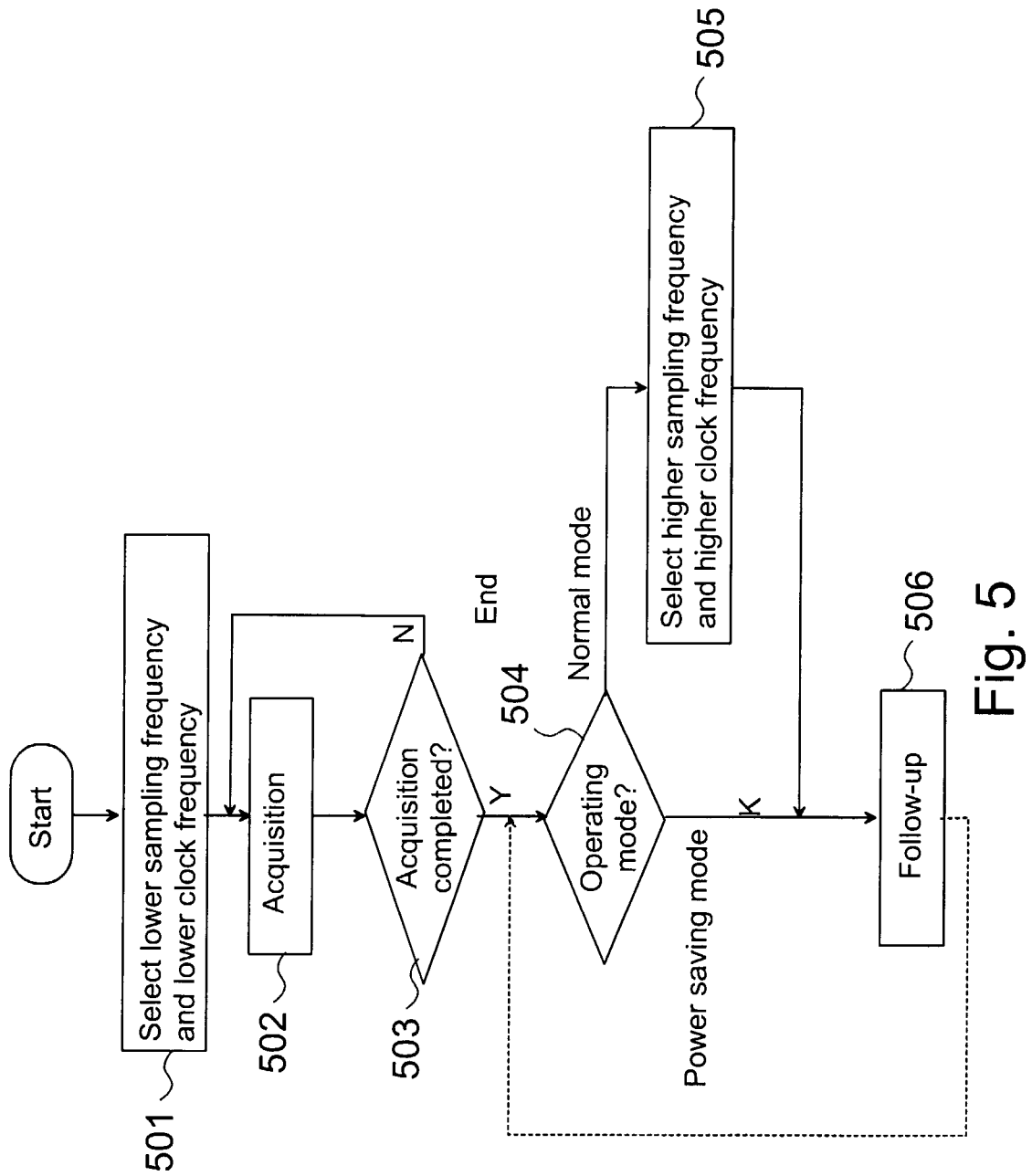
FIG. 5 shows, in a flow chart, essential steps in the method according to one embodiment of the invention.

In the following, the operation of the method according to one embodiment of the invention will be described with reference to the flow chart shown in FIG. 5. Let us assume that two clock frequencies are selectable, as well as two different sample signals formed at two different sampling frequencies, to be processed in the receiving channels 2. Let us also assume that different modes are defined for different situations, such as, for example, a power saving mode and a normal mode. However, it should be evident that the receiver 1 can always function, for example, in the power saving mode. Let us assume that signal acquisition is performed first. Thus, at the beginning of the operation, second samples are selected, i.e., the samples formed in the decimation block 1.11, to be led into the receiving channels 2. Furthermore, the clock frequency of the receiving channels 2 is selected by the clock signal selectors 1.13 to be the lower clock frequency, i.e., the clock signal formed by the divider block 1.14. These steps are illustrated with block 501 in the flow chart of FIG. 5. After this, an acquisition step 502 is performed until one of the receiving channels 2 has acquired the desired signal 503. Next, the mode is examined 504, and if it is the normal mode, the next step is taken in block 505, in which first samples are selected for the respective receiving channel 2 by the respective channel selector 1.12, to be input in the receiving stages 2.1, 2.7, 2.8. Furthermore, the clock signal to be led to the receiving channel 2 is selected by the clock signal selector 1.13 for the respective channel, to be the first clock signal, i.e. the higher clock signal. Thus, in a tracking step 506, the higher sampling rate and the respective clock frequency are used to improve the tracking function, particularly under poor signal conditions. However, if the mode is, for example, the power saving mode, the selection control of the selectors 1.12, 1.13 is not changed, wherein the same sampling rate and clock frequency are used in the tracking step 506 as in the acquisition step. By this, a lower power consumption is achieved than when using a higher sampling rate and clock frequency. The above-mentioned determination 504 of the mode and the selection 505 of the samples (sampling rate) and the clock frequency can be performed after the acquisition step and, for example, when the mode is changed.

The above-mentioned steps are taken for each receiving channel 2, on which signals are received.

The receiver 1 according to the invention can be used to receive signals from positioning stations of several different positioning systems. Thus, for each receiving channel 2, the desired control data is selected for the selectors 1.12, 1.13 according to the sampling rate and clock frequency to be used. Thus, there may be a need to implement several decimation blocks 1.11 and divider blocks 1.14, in which the value of the divider is set so as to achieve the desired sampling rate and clock frequency. Thus, the selectors 1.12, 1.13 can be used to select, for each receiving channel 2, such a decimation block 1.11 and divider block 1.14 in which the divider used is set to correspond to the parameters of the positioning system which is received on the receiving channel 2 in question.

Figure 4:
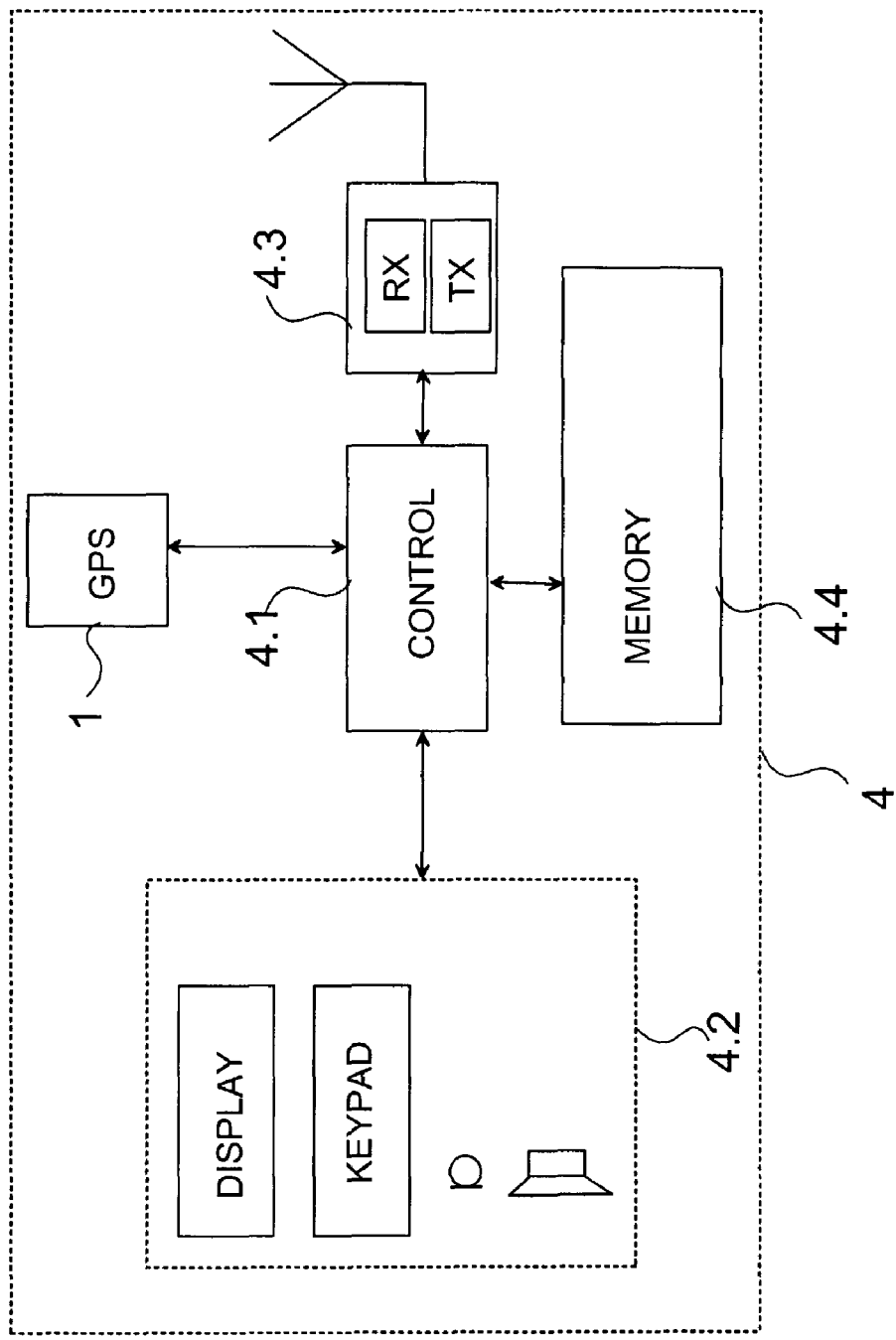
FIG. 4 shows a device according to one embodiment of the invention in a simplified block diagram.

The receiver 1 according to the invention may function as such, or it may be a part of another device, for example a positioning receiver 1 in connection with a mobile communication device 4 (FIG. 4). The mobile station 4 of FIG. 4 also shows a control block 4.1, a user interface 4.2, mobile communication means 4.3, and a memory 4.4. In such a combined device, some of the functional blocks, such as the user interface and the control block, may also be shared.

It should be understood that the present invention is not limited solely to the above-presented embodiments but it can be modified within the scope of the appended claims.

The invention claimed is:

1. A positioning receiver comprising
one or more receiving channels to receive a signal from a positioning station;
a controlling element for controlling the reception of the signal from the positioning station;
a clock generator for generating a clock signal for said controlling element;
a sampler for taking samples at at least first and second sampling rates, and
a first selector for selecting samples from the samples taken at said at least first and second sampling rates, to be used in said controlling element in the control of the signal reception.

2. The positioning receiver according to claim 1, said controlling element comprising an acquisition element for acquisition of the signal to be received.

3. The positioning receiver according to claim 1, wherein said controlling element comprises a tracking element for the tracking of the signal to be received.

4. The positioning receiver according to claim 1, also comprising
a signal generator for generating at least a first and a second clock frequency, and
a second selector for selecting, from said at least first and second clock frequencies, a clock frequency for the clock signal to be input in said controlling element, to be used in the control of the signal reception.

5. The positioning receiver according to claim 4, wherein said sampler comprises a decimator for the decimation of the samples, and the signal generator for generating at least first and second clock frequencies comprise a divider block for dividing the clock signal.

6. The positioning receiver according to claim 5, wherein said decimator is configured to perform the decimation of the samples by a factor N, and the divider block is configured to divide the clock signal by the factor N.

7. The positioning receiver according to the claim 1 comprising at least a first mode and a second mode, wherein a first clock frequency and a first sampling rate are arranged to be used in the first mode, and a second clock frequency and a second sampling rate are arranged to be used in the second mode.

8. The positioning receiver according to claim 7, wherein the second mode is a power saving mode, wherein the second clock frequency is lower than the first clock frequency and the second sampling rate is lower than the first sampling rate.

9. The positioning receiver according to claim 1 comprising at least two receiving channels, which comprise said sampler.

10. A system comprising:
   positioning stations which transmit a signal for use in positioning; and a positioning receiver which comprises
   one or more receiving channels to receive a signal from a positioning station;
   a controlling element for controlling the reception of the signal from the positioning station;
   a clock generator for generating a clock signal for said controlling element;
   a sampler for taking samples at at least first and second sampling rates; and
   a first selector for selecting samples from the samples taken at said at least first and second sampling rates, for use in said controlling element in the control of the signal reception.

11. The system according to claim 10, wherein said controlling element comprises an acquisition element for acquisition of the signal to be received.

12. The system according to claim 10, wherein said controlling element comprises a tracking element for the tracking of the signal to be received.

13. The system according to claim 10 also comprising a signal generator for generating at least a first and a second clock frequency, and a second selector for selecting, from said at least first and second clock frequencies, a clock frequency for the clock signal to be input in said controlling element, to be used for the acquisition of the signal, the tracking of the signal, or both.

14. The system according to claim 13, wherein said sampler comprises a decimator for the decimation of the samples, and the signal generator comprises a divider block for dividing the clock signal.

15. The system according to claim 14, wherein in said decimator, the decimation of the samples is arranged to be carried out by a factor N, and in the divider block, the clock signal is arranged to be divided by the factor N.

16. A wireless communication device comprising:
   one or more receiving channels for receiving a signal from a positioning station;
   a controlling element for controlling the reception of the signal from the positioning station;
   a clock generator for generating a clock signal for said controlling element;
   a sampler for taking samples at least first and second sampling rates; and
   a first selector for selecting samples from the samples taken at said at least first and second sampling rates, for use in said controlling element in the control of the signal reception.

17. The wireless communication device according to claim 16, wherein said controlling element comprises an acquisition element for the acquisition of the signal to be received.

18. The wireless communication device according to claim 16, wherein said controlling element comprises tracking means for the tracking of the signal to be received.

19. A module comprising:
   one or more receiving channels for receiving a signal from a positioning station;
   a controlling element for controlling the reception of the signal from the positioning station;
   an input for inputting a clock signal for said controlling element;
   a sampler for taking samples at at least first and second sampling rates; and
   a first selector for selecting samples from the samples taken at said at least first and second sampling rates, for use in said controlling element in the controlling the reception of the signal.

20. A method comprising:
   receiving a signal from a positioning station on one or more positioning channels,
   controlling the reception of the signal from the positioning station,
   generating a clock signal for use in said controlling,
   taking samples at at least first and second sampling rates,
   selecting samples from the samples taken at said at least first and second sampling rates, and
   using the samples in said control step for controlling the signal reception.

21. The method according to claim 20 said controlling comprising performing acquisition of the signal to be received.

22. The method according to claim 20 said controlling comprising tracking of the signal to be received.

23. The method according to claim 20 comprising:
   forming at least first and second clock frequencies, and
   selecting a frequency for the clock signal from said at least first and second clock frequencies for use for the acquisition of the signal, the tracking of the signal, or both.

24. The method according to claim 23, wherein said taking samples at the second sampling rate comprises performing decimation of the samples taken at the first sampling rate, and said forming the second clock frequency comprises dividing the first clock frequency.

25. The method according to claim 24, wherein the decimation and the division are performed by a factor N.

26. The method according to claim 20 comprising defining at least a first and a second mode, wherein the first clock frequency and the first sampling rate are used in the first mode, and the second clock frequency and the second sampling rate used in the second mode.

27. The method according to claim 26, wherein the second mode is a power saving mode, wherein the second clock frequency is lower than the first clock frequency, and the second sampling rate is lower than the first sampling rate.

28. A computer software product comprising machine executable commands for
   receiving a signal from a positioning station on one or more positioning channels,
   controlling the reception of the signal from the positioning station,
   generating a clock signal to be used in said controlling,
   taking samples at at least first and second sampling rates,
   selecting samples from the samples taken at said at least first and second sampling rates, and
   using the selected samples in said controlling the reception of the signal.

29. A positioning receiver, which comprises
   one or more receiving channels to receive a signal from a positioning station;
   control means for controlling the reception of the signal from the positioning station;
   means for generating a clock signal for said control means;
   means for taking samples at at least first and second sampling rates; and
   means for selecting samples from the samples taken at said at least first and second sampling rates, to be used in said control means in the control of the signal reception.

* * * * *